2,705,237
Patented Mar. 29, 1955

2,705,237
PROCESS FOR PRODUCING STEROID TRIENES

Carl Djerassi, George Rosenkranz, Stephen Kaufmann, John Pataki, and Jesus Romo, Mexico City, Mexico, assignors to Syntex S. A., Mexico City, Mexico, a corporation of Mexico No Drawing. Application March 28, 1950,
Serial No. 152,498

22 Claims. (Cl. 260—397.3)

The present invention relates to cyclopentanoperhydrophenanthrene compounds. More particularly the present invention relates to the production of estrogens and novel estrogen intermediates.

There are numerous references in the scientific literature to the effect that it is not possible to convert a $\Delta^4$-3-ketosteroid, as for example, testosterone, into a phenol, as for example, estradiol, because the mono and subsequent poly bromination of ring A of $\Delta^4$-3-ketosteroids results in the formation of compounds provided with halogen atoms in position 4 of ring A and in ring B.

In accordance with the present invention, however, it has been discovered that poly bromination of $\Delta^4$-3-ketosteroids and especially of the androstane series, such as testosterone, its esters or ethers, $\Delta^4$-androstene-3,17-dione, etc., can be effected under special conditions to obtain a novel dibromo ketone probably possessing the 2,6-dibromo-$\Delta^4$-3-ketosteroid or the 2,2-dibromo-$\Delta^4$-3-ketosteroid configuration. It has further been discovered in accordance with the present invention that the product of the bromination may be subjected to dehydrobromination to produce a $\Delta^{1,4,6}$-triene-3-one.

It has further been discovered in accordance with the present invention that the 6-bromo-$\Delta^4$-3-ketosteroids and the 2-bromo-$\Delta^4$-3-ketosteroids may be further brominated to produce dibromo compounds which may be deheydrobrominated to produce the same triene.

The novel $\Delta^{1,4,6}$-triene-3-ones produced in accordance with the present invention can be aromatized to produce $\Delta^6$ unsaturated phenols of the steroid series, as for example, the previously unknown $\Delta^6$-dehydroestradiol and the esters thereof. Thereafter mild catalytic hydrogenation of the $\Delta^6$ estrogens produced results in excellent yield in the production of the natural estrogens as well as other compounds known and unknown in the estrogen series.

Further, it has been discovered that the novel $\Delta^{1,4,6}$-3-ketosteroids may be readily dehydrogenated to produce equilenin and/or derivatives thereof. The present invention also provides a novel method for the production of mixed esters of estradiol.

The preferred method for the production of the dibromo $\Delta^4$-3-ketosteroids in accordance with the present invention may be exemplified by the following equation:

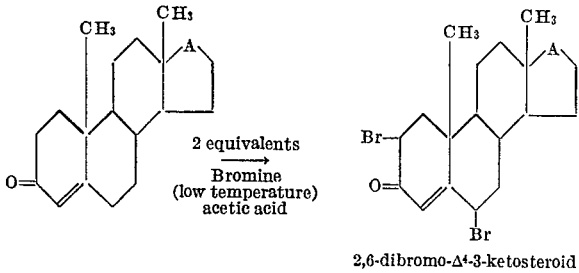

2,6-dibromo-$\Delta^4$-3-ketosteroid

In the above process A may be C=O or CH—OR and R may be hydrogen, a lower alkyl group, as for example methyl or ethyl, or an aromatic group, such as benzyl or the residue of a lower fatty acid or aromatic acid, as for example, acetic acid, propionic acid or benzoic acid. Although in the above equation the dibromo compound has been indicated as the 2,6-dibromo compound since on dehydrobromination, the $\Delta^{1,4,6}$-triene-3-ones are formed, it is not desired to be limited to this structure. Upon treatment with collidine for dehydrobromination, as hereinafter set forth, rearrangement may take place and therefore for example, the corresponding 2,2-dibromo compound may also be the result of dibromination and rearrange during dehydrobromination to produce the $\Delta^{1,4,6}$-triene-3-one.

It may be noted that when testosterone acetate is brominated in ether-acetic acid solution, as by treatment with 2 equivalents of bromine at 0° C., a dibromo derivative is produced in 85–90% yield. This dibromo derivative has a melting point of 174° C. (with decomposition) $[\alpha]_D+43°$ and an ultra-violet maximum at 248–250 $\mu$. This same compound is also produced, as will be hereinafter set forth, on dibromination with 2 mols of N-bromosuccinimide in carbon tetrachloride and on mono bromination of 6-bromo testosterone acetate with bromine in ether-acetic acid. Boiling with collidine, as will hereinafter be set forth, of the dibromo compounds resulted in a smooth loss of 2 mols of hydrogen bromide and produced $\Delta^{1,4,6}$-androstatriene-17-ol-3-one 17-acetate which was identical with a specimen prepared from a corresponding $\Delta^{1,4}$-dienone followed by dehydrobromination. It is desired to point out, however, that occasionally in the dibromination of testosterone acetate as described, a dibromo derivative was obtained with the same decomposition point and approximately the same rotation as just mentioned but with an ultra-violet maximum at approximately 240 $\mu$. Further, when the mother liquors of the 250 $\mu$ product were diluted with water and recrystallized a product was produced having an ultra-violet maximum invariably at 240 $\mu$. Further, $\Delta^4$-androstene-3,17-dione was also smoothly dibrominated under the same conditions mentioned above to give an 80% yield of a dibromo ketone exhibiting a maximum at 240 $\mu$ whereas mono bromination of 2-bromo and 6-bromo-$\Delta^4$-androstene-3,17-dione gave an isomeric dibromo ketone characterized by a maximum at 250 $\mu$. Both of these compounds, however, on collidine dehydrobromination were dehydrobrominated to $\Delta^{1,4,6}$-androstatriene-3,17-dione. From the foregoing it, therefore, appears, as previously set forth, that two isomeric dibromo compounds are produced and one of these compounds, probably possessing the 2,2-dibromo configuration, rearranges on collidine dehydrobromination to produce the $\Delta^{1,4,6}$-trienone.

The bromination with two equivalents of bromine is preferably performed at a low temperature and especially temperatures from approximately 0°–15° C. The compound is also preferably dissolved in an organic solvent and preferably an ether solvent such as ethyl ether or similar ethers. However, the reaction may be performed in the presence of glacial acetic acid alone. For the bromination a small quantity, i. e. a few drops of a catalyst such as hydrogen bromide is desirable.

The reaction proceeds to completion as evidenced by a decolorization in a relatively short period of time, as for example fifteen minutes, and the resulting solution may then be concentrated at room temperature under reduced pressure and the dibromo compound filtered therefrom and recrystallized from a suitable solvent, as for example ethanol and/or chloroform. Although glacial acetic acid has been prescribed as the preferred solvent for the reaction, other lower fatty acids can be used, as for example glacial propionic acid.

The dibromo derivatives above set forth may also be produced by the reaction of two equivalents of N-bromo-succinimide on the $\Delta^4$-3-ketosteroid in the presence of strong light, as for example a photo-flood lamp or an ultra-violet producing lamp. This reaction may be indicated by the following equation:

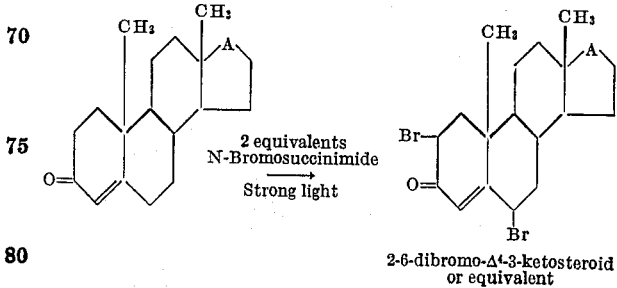

2-6-dibromo-$\Delta^4$-3-ketosteroid
or equivalent

In the above process A may be C=O or CH—OR and R may be hydrogen, a lower alkyl group, as for example, methyl or ethyl, or an aromatic group, such as benzyl or the residue of a lower fatty acid or aromatic acid, as for example acetic acid, propionic acid or benzoic acid.

In general in the above reaction the $\Delta^4$-3-keto-steroid is dissolved in a suitable inert organic solvent, as for example carbon tetrachloride and refluxed for a short period of time, as for example twenty-five minutes while exposed to the strong light. Thereafter, upon the completion of the reaction as determined by the residual succinimide floating to the top of the solution, the solution is filtered and then evaporated to crystallize the dibromo derivative therefrom and the dibromo derivative is thereafter recrystallized from a suitable solvent, as for example ethanol and/or chloroform to produce the pure dibromo compound.

The same dibromo derivatives may also be produced by the reaction of 6-bromo-$\Delta^4$-3-ketosteroids and 2-bromo-$\Delta^4$-3-ketosteroids with one equivalent of bromine at a low temperature in the presence of a lower fatty acid, as for example glacial acetic acid as exemplified by the following formula:

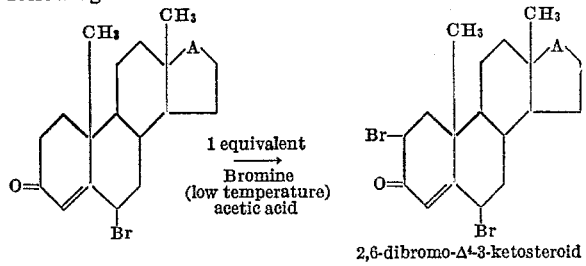

2,6-dibromo-$\Delta^4$-3-ketosteroid

In the above process A may be C=O or CH—OR and R may be hydrogen, a lower alkyl group, as for example methyl or ethyl, or an aromatic group, such as benzyl or the residue of a lower fatty acid or aromatic acid, as for example acetic acid, propionic acid or benzoic acid.

The 6-bromo-$\Delta^4$-3-ketosteroid may be produced by the reaction of one mol of N-bromosuccinimide on the

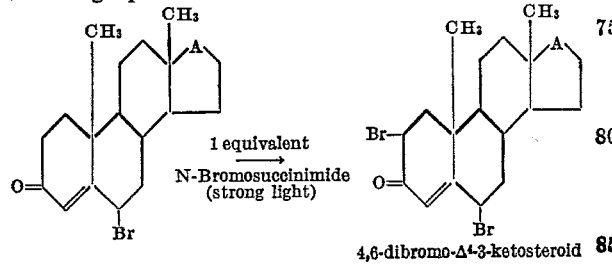

$\Delta^4$-3-ketosteroids in the absence of strong light and under reflux conditions. The conditions for the further bromination of the 6-bromo compound thus produced are similar to that previously described, i. e. the 6-bromo-compound is preferably dissolved in an inert organic solvent, preferably an ether, cooled to a low temperature, preferably between 0° and 15° C., a few drops of hydrogen bromide in acetic acid added, and then treated with a bromine-acetic acid solution. The dibromo compound produced may then be separated and recrystallized as previously described.

A 2-bromo-$\Delta^4$-3-ketosteroid, for example the known 2-bromo-$\Delta^4$-androstene-3,17-dione similarly mono brominated also produced a similar dibromo compound.

The dibromo compounds may further be produced by treating 6-bromo-$\Delta^4$-3-keto and the 2-bromo-$\Delta^4$-3-keto compounds with one equivalent of N-bromosuccinimide in the presence of strong light, as exemplified by the following equation:

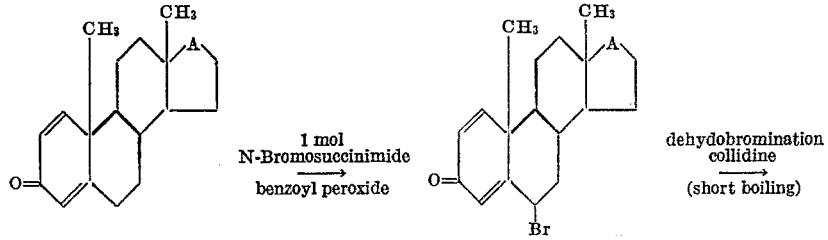

4,6-dibromo-$\Delta^4$-3-ketosteroid

In the above process A may be C=O or CH—OR and R may be hydrogen, a lower alkyl group, as for example methyl or ethyl, or an aromatic group, such as benzyl or the residue of a lower fatty acid or aromatic acid, as for example acetic acid, propionic acid or benzoic acid.

The general conditions of this last reaction indicated above are entirely similar to the dibromination previously set forth using N-bromosuccinimide.

The above disclosed dibromo ketones which probably possess the 2,6-dibromo-$\Delta^4$-3-ketosteroid or the 2,2-dibromo-$\Delta^4$-3-ketosteroid configuration, as above indicated, may be converted to novel $\Delta^{1,4,6}$-triene-3-ones in accordance with the following equation:

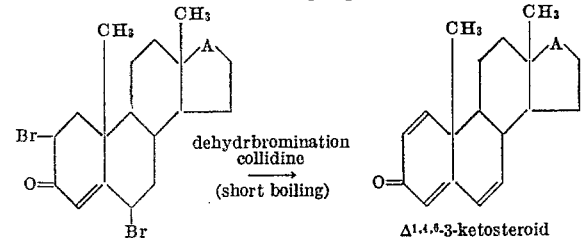

$\Delta^{1,4,6}$-3-ketosteroid

Preferably the dibromo compound is dissolved in a tertiary amine, preferably collidine and refluxed for a period of time sufficient to remove 2 mols of hydrogen bromide as indicated by the weight of the precipitated collidine hydrobromide. The solution is thereafter diluted with ether, washed with dilute acid and water, dried and evaporated. The crystalline residue may then be recrystallized from a suitable solvent or mixtures thereof, as for example, hexane or acetone, to yield $\Delta^{1,4,6}$-3-ketosteroids.

The $\Delta^{1,4,6}$-3-ketosteroids may also be prepared by reacting the known $\Delta^{1,4}$-3-ketosteroids with one mol of N-bromosuccinimide in the presence of benzoyl peroxide to produce the 6-bromo derivative thereof and the 6-bromo derivative thus produced thereafter subjected to dehydrobromination with a tertiary amine, such as collidine. This reaction may be exemplified by the following equation:

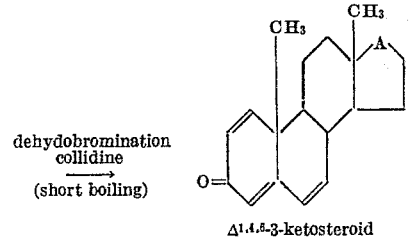

$\Delta^{1,4,6}$-3-ketosteroid

The $\Delta^{1,4}$-3-ketosteroid may be dissolved in a suitable solvent, such as carbon tetrachloride and refluxed with one equivalent of N-bromosuccinimide in the presence of a suitable catalyst, as for example dibenzoyl peroxide. Thereafter the mixture may be chilled, the succinimide filtered and the filtrate evaporated to dryness and triturated with ether. The crystals of the 6-bromo derivative obtained after recrystallization from ether and acetone may be dissolved in and refluxed with a tertiary amine, such as collidine, and worked up in a similar manner to that previously described to prepare the $\Delta^{1,4,6}$-3-ketosteroid which proved to be identical to those prepared in accordance with the method previously described.

The $\Delta^{1,4,6}$-3-ketosteroids prepared as hereinbefore set forth when dissolved in a suitable solvent and heat treated at temperatures preferably between 500 and 650° C. may be aromatized to form a $\Delta^6$ unsaturated phenol of the steroid series. This reaction may be indicated in accordance with the following equation:

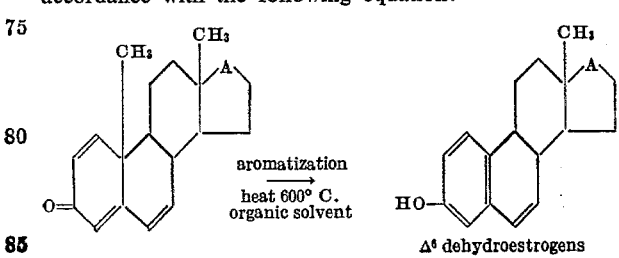

$\Delta^6$ dehydroestrogens

In the above equation A indicates the groupings previously set forth.

The above reaction is preferably performed by passing a dilute solution, as for example 2% by weight of the $\Delta^{1,4,6}$-3-ketosteroid through a tube filled with glass helices and heated to a temperature, as for example of 600° C. and preferably between 500° and 650° C. The solvents used are preferably hydrogen donor solvents such as tetralin, minerol oil, dihydronaphthalein, dihydrophenanthrene, cyclohexene, etc. When the above process is practiced for example using $\Delta^{1,4,6}$-androstatriene-17-ol-3-one 17-acetate which was obtained from testosterone acetate by the procedures previously outlined, there was obtained in good yield a previously unknown $\Delta^6$-dehydroestradiol 17-monoacetate and by saponification thereof the new $\Delta^6$-dehydroestradiol. The new $\Delta^6$-dehydroestradiol was characterized by high estrogenic potency and by a strong negative rotation.

The $\Delta^{1,4,6}$-ketosteroid and/or derivative thereof after passing through the heated tube was passed through a condenser and the condensate was then chilled to precipitate the crystals of the $\Delta^6$-estrogen thus produced. The $\Delta^6$-estrogen could then be recrystallized from a suitable solvent, as for example methanol. Additional amounts of the product could also be obtained from the filtrate by extraction with 5% alkali and acidification. In the case where A, as indicated above, was for example an ester grouping the free phenol could be obtained by saponification with alkali.

The $\Delta^6$-dehydro estrogen compounds prepared in accordance with the previous procedure were subjected to mild hydrogenation to prepare the corresponding estrogens in accordance with the following equation:

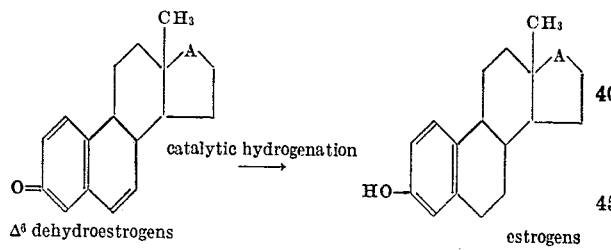

$\Delta^6$ dehydroestrogens → estrogens (catalytic hydrogenation)

In the above equation A indicates the groups previously set forth.

The hydrogenation reaction above set forth preferably takes place in the presence of a palladium-on-charcoal catalyst or other suitable hydrogenation catalyst. For example, when a solution of $\Delta^6$-dehydroestradiol-17-mono-acetate in ethyl acetate, in the presence of a 10% palladium-on-charcoal catalyst, was shaken in an atmosphere of hydrogen for twenty minutes, estradiol-17-monoacetate was produced.

The foregoing novel methods are especially desirable for the production of 17-mono esters and mixed esters of estradiol. These mixed esters were very difficult to prepare according to known methods, since they involved partial mono-esterification in two steps or other equally difficult procedures. In accordance with the present invention, however, the 17-mono esters and mixed esters may be prepared in a relatively simple manner. The following equation illustrates the procedure:

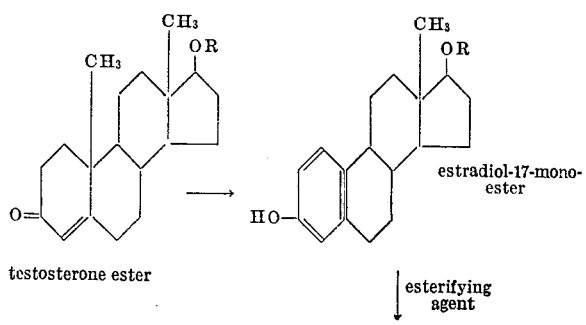

testosterone ester → estradiol-17-mono-ester (esterifying agent)

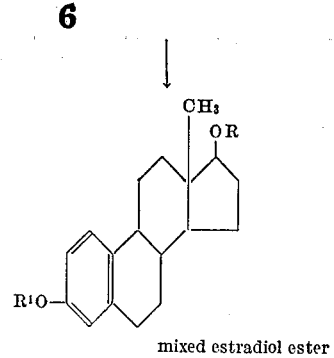

mixed estradiol ester

In the above above equation the steps previously outlined have not been indicated in detail as it is obvious that the same steps are to be followed to the point where the estradiol-17-mono-acylate is prepared. In the above equation R may represent the residue of a lower fatty acid or aromatic acid, as for example acetic acid, propionic acid or benzoic acid, and $R^1$ may represent the residue of a different lower fatty acid or aromatic acid, as for example acetic acid, propionic acid or benzoic acid. Thus when the starting material for the process previously outlined is a given ester of testosterone, as for example testosterone acetate, after going through the procedure previously outlined estradiol 17-acetate is obtained which can then be esterified at the 3-position with another acylating agent to thus produce the therapeutically desirable mixed esters of estradiol.

The $\Delta^6$ estrogens prepared in accordance with the present invention according to the procedure previously outlined also may be utilized to successfully partially synthesize the sex hormone equilenin and derivatives thereof in accordance with the following equation:

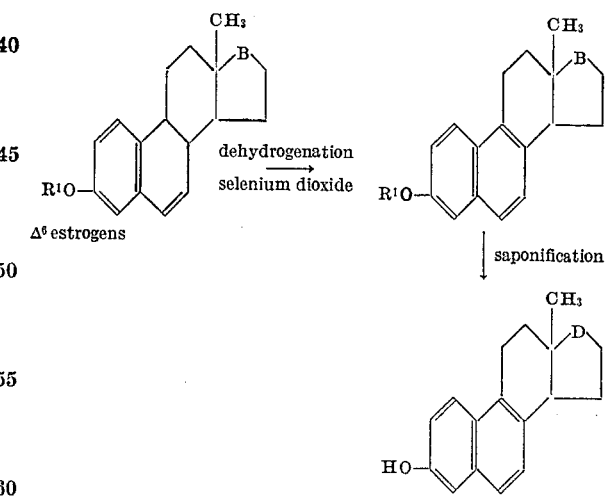

$\Delta^6$ estrogens → (dehydrogenation selenium dioxide) → saponification →

In the above equation B may be C=O or CH—OR and R may be the residue of a lower fatty acid such as acetic or propionic acid or an aromatic acid such as benzoic; or R may be a lower alkyl group such as ethyl or an aromatic group such as benzyl. In the above equation D may be C=O or CH—OH. $R^1$ may be the residue of a lower fatty acid such as acetic or propionic acid or an aromatic acid such as benzoic; or $R^1$ may be a lower alkyl group such as ethyl or an aromatic group such as benzyl.

Although selenium dioxide is the preferred dehydrogenating agent for the above reaction, other common dehydrogenating agents, such as palladized charcoal, other precious metal catalysts, chloranyl and the like, may be used. In general the $\Delta^6$-estrogen is dissolved in a suitable solvent, such as acetic acid, and boiled in a current of nitrogen with a suitable quantity of selenium dioxide or other catalyst for a short period of time, as for example 8–15 minutes. The reaction mixture is then filtered, the filtrate diluted with water and extracted with a suitable solvent and evaporated to crystallize the product. Although the esters of the $\Delta^6$-estrogens are preferably used in the reaction, the ethers may also be used as set forth above.

The following specific examples serve to illustrate the present invention but are not intended to limit the same:

Example I

A solution of 19.85 g. of testosterone acetate in 650 cc. of dry ether was cooled in ice to a temperature of approximately 0° C. A few drops of 4 N hydrogen bromide in acetic acid were added followed by a solution of 19.5 g. of bromine in 180 cc. of acetic acid at the rate at which the solution decolorized. After approximately 5 to 10 minutes the ether and part of the acetic acid were distilled off under reduced pressure at 15–20° C. and the product filtered and washed with ethanol. A yield of approximately 65–70% of colorless needles of dibromo testosterone acetate was obtained having a melting point varying from 168–170° C. to 172–174° C. and rotations between $[\alpha]_D^{20}+43°$ to $+47°$. The ultra-violet maximum was either at 240 mu (log E 4.10) or at 250 mu (log E 4.11). From the filtrate by dilution with water and recrystallization 20–25% of additional material was isolated with the same melting point and optical rotations varying from $+37°$ to $+43°$ and the ultra-violet maximum invariably at 240 mu (log E 4.10). Recrystallization of the above materials from ethanol-chloroform gave an analytical sample with a melting point of 172–174° C. (decomposition). Occasionally a melting point of 155–158° C. (decomposition) was observed: $[\alpha]_D^{20}+46°$, ultraviolet maximum as previously set forth.

*Analysis.*—Calculated for $C_{21}H_{28}O_3Br_2$: C, 51.65; H, 5.78. Found (for both samples with different ultra-violet maximum): C, 51.78, 51.89; H, 5.64, 5.60.

Example II $\Delta^4$-androstene-3,17-dione was dibrominated exactly as described in Example I for the testosterone acetate. The only difference was that a suspension of the starting material was employed since the ketone was not sufficiently soluble in ether. On working up as described in connection with Example I approximately 60% of colorless crystals of dibromo - $\Delta^4$ - androstene-3,17-dione, melting point 170–173° C. $[\alpha]_D^{20}+112°$, ultra-violet maximum at 240 mu was obtained and an additional 20–22% of equal purity from the mother liquors. Recrystallization from chloroform-ethanol yielded colorless needles having a melting point of 172–175° C. (with decomposition) $[\alpha]_D^{20}+116°$, ultra-violet maximum at 240 mu (log E 4.19).

*Analysis.*—Calculated for $C_{19}H_{24}O_2Br_2$: C, 51.37; H, 5.45; Br, 35.98. Found: C, 51.09; H, 5.69; Br, 35.99.

Example III 2 g. of 2-bromo-$\Delta^4$-androstene-3,17-dione were suspended in 70 cc. of ether and 25 cc. of glacial acetic acid cooled in ice as in Example I. A few drops of 4 N hydrogen bromide in acetic acid were added followed by a solution of 0.88 g. of bromine in 12 cc. of acetic acid in accordance with the procedure of Example I. Complete decolorization and solution required approximately 40 minutes. A dibromo ketone was attained in approximately 60% yield, having a melting point of 161–163° C. $[\alpha]_D^{20}+107°$, ultra-violet maximum at 250 mu (log E 4.20). Found: C, 51.05; H, 5.27.

Example IV 2 g. of 6-bromo-$\Delta^4$-androstene-3,17-dione were suspended in 70 cc. of ether and 25 cc. of glacial acetic acid cooled in ice as in Example I. A few drops of 4 N hydrogen bromide in acetic acid were added followed by a solution of 0.88 g. of bromine in 12 cc. of acetic acid in accordance with the procedure of Example I. Complete decolorization and solution required approximately 40 minutes. A dibromo ketone was attained in approximately 60% yield, having a melting point of 161–163° C. $[\alpha]_D^{20}+107°$, ultra-violet maximum at 240 mu (log E 4.20). Found: C, 51.05; H, 5.27.

Example V

Monobromination of 6-bromotestosterone acetate with equal molar parts of bromine in ether-acetic acid in accordance with the procedure of Example I produced in 60% yield a dibromo derivative with a melting point of 169–173° C. (decomposition) $[\alpha]_D^{20}+42°$, ultra-violet maximum at 248 mu (log E 4.10).

Example VI

A mixture of 3.3 g. of testosterone acetate, 3.5 g. of N-bromosuccinimide and 50 cc. of carbon tetrachloride was refluxed for 25 minutes while exposed to strong light. The reaction mixture was then filtered and the filtrate evaporated to crystallize the dibromo compound. Recrystallization from a mixture of chloroform and ethanol produced 1 g. (20% yield) of dibromo testosterone acetate, having a melting point of 165–168° C. (decomposition- $[\alpha]_D^{20}+44°$, ultra-violet maximum at 248 mu (log E 4.15).

Example VII

A mixture of 5 g. of 2-bromotestosterone acetate, 2.7 g. of N-bromosuccinimide and 30 cc. of carbon tetrachloride was refluxed for 25 minutes with exposure to strong light. After the same work-up as in Example VI, the same dibromo derivative there disclosed was produced.

Example VIII

A mixture of 5 g. of 6-bromotestosterone acetate, 2.7 g. of N-bromosuccinimide and 30 cc. of carbon tetrachloride was refluxed for 25 minutes with exposure to strong light. After the same work-up as in Example VI, the same dibromo derivative there disclosed was produced.

Example IX

A solution of 22.4 g. of the dibromo testosterone acetate of either Example I, Example V or Example VI in 120 cc. of dry distilled collidine was refluxed for 30 minutes. A loss of 2 mols of hydrogen bromide in the form of precipitated collidine hydrobromide was observed. The solution was diluted with ether, washed with dilute acid and water, dried and evaporated to produce light tan crystals of $\Delta^{1,4,6}$-androstatrien-17-ol-3-one 17-acetate having a melting point of 144–147° C. in an average yield of approximately 45% based on the original testosterone acetate. The yield was not influenced whether a dibromo ketone with an ultra-violet maximum at 240 mu or 250 mu was employed. An analytical sample was recrystallized from a mixture of hexane and acetone or ether to yield large prismatic needles having a melting point of 151–153° C. $[\alpha]_D^{20}-11°$, ultra-violet maximum at 222 mu (log E 4.18), 256 mu (log E 4.09), 298 mu (log E 4.21).

*Analysis.*—Calculated for $C_{21}H_{26}O_3$: C, 77.27; H, 8.03. Found: C, 77.47; H, 8.16.

Example X 2 g. of the $\Delta^{1,4,6}$-androstatrien-17-ol-3-one 17-acetate of Example IX were saponified by refluxing with 2 g. of potassium hydroxide in 80 cc. of methanol and 10 cc. of water. Dilution with water, filtration and recrystallization from a mixture of ether and hexane produced 1.7 g. of $\Delta^{1,4,6}$-androstatrien-17-ol-3-one, melting point 156–157.5° C. $[\alpha]_D^{20}+17.6°$, ultra-violet maximum at 222 mu (log E 4.17), 258 mu (log E 4.23) and 298 mu (log E 4.16).

*Analysis.*—Calculated for $C_{19}H_{24}O_2$: C, 80.24; H, 8.51. Found: C, 80.26; H, 8.58.

Example XI

Dibromo-$\Delta^4$-androstene-3-17-dione was dehydobrominated with collidine in exactly the same manner as that described for the dibromotestosterone acetate of Example IX. The same product was produced with the dibromo compounds of Examples II, III and IV. $\Delta^{1,4,6}$-androstatrien-3-17-dione was produced in 45% yield with a melting point of 164–165° C. $[\alpha]_D^{20}+82°$ (chloroform, $+71°$ (dioxane), ultra-violet maximum at 222, 256 and 298 mu.

Example XII

A solution of 42 g. of $\Delta^{1,4}$-androstadiene-3-17-dione in 400 cc. of carbon tetrachloride was refluxed with 27 g. of N-bromosuccinimide and 2 g. of benzoyl peroxide for 75 minutes. After filtration of succinimide the filtrate was cooled in ice until crystallization was complete. After recrystallization from a mixture of ether and hexane the 6-bromo-$\Delta^{1,4}$-androstadiene-3-17-dione had a melting point of 189–192° C. (with decomposition) $[\alpha_D]^{20}+118°$ (chloroform), $+115.6°$ (dioxane), ultraviolet maximum at 250 mu (log E 4.34).

*Analysis.*—Calculated for $C_{19}H_{25}O_2Br$: C, 62.82; H, 6.38. Found: C, 63.66; H, 6.47.

The above product was dehydrobrominated by refluxing with 200 cc. of collidine for 15 minutes and then poured into dilute sulfuric acid. The product was then extracted with ethyl acetate, washed free of collidine with dilute acid, dried and concentrated to approximately 50 cc. After chilling in ice, 27 g. of crystals were produced which could be further repurified by recrystallization from ethyl acetate. The compound was identical in every respect with the $\Delta^{1,4,6}$-androstatrien of Example XI.

Example XIII 2.15 g. of $\Delta^{1,4}$-androstadiene-17-ol-3-one 17-acetate, 1.18 g. of N-bromosuccinimide and 75 mg. of benzoyl peroxide in 25 cc. of carbon tetrachloride were refluxed for 100 minutes. The product of the reaction was treated according to the procedure of Example XII to produce a 6-bromo derivative having a melting point of 142–144° C., ultra-violet maximum 248 mu (log E 4.32). The 6-bromo derivative was then dehydrobrominated by refluxing for 25 minutes with 10 cc. of collidine. $\Delta^{1,4,6}$-androstatrien-17-ol-3-one 17-acetate was obtained which was identical in all respects with the product of Example IX.

Example XIV

A solution of 5.5 g. of $\Delta^{1,4,6}$-androstatrien-3,17-dione of Example XI in 550 cc. of mineral oil was passed at a rate of 2 cc. per second through a glass tube filled with helices and heated to 600° C. The product was cooled overnight in an ice box and the light tan crystals precipitated were filtered and washed free of mineral oil with hexane. 2.1 g. (40%) of $\Delta^6$-dehydroestrone having a melting point of 255–262° C. was obtained. Recrystallization from methanol produced stout prisms having a melting point of 261–263° $[\alpha]_D^{20}$—127° (dioxane), ultra-violet maximum at 220 mu (log E 4.49), 262 mu (log E 3.95) and 304 mu (log E 3.44). The $\Delta^6$-dehydroestrone thus produced possessed one-third the estrogenic potency of estrone in rats.

Example XV 2 g. of $\Delta^6$-dehydroestrone of Example XIV were heated for two hours on a steam bath with 20 cc. of pyridine and 5 cc. of acetic anhydride, poured into water, and the product collected and recrystallized from methanol. Recrystallization from methanol produced $\Delta^6$-dehydroestrone acetate having a melting point of 140–140.5° C. $[\alpha]_D^{20}$—113.7° (dioxane).

Example XVI

To a mixture of 0.5 g. of lithium aluminum hydride in 100 cc. of anhydrous ether was added slowly a solution of 1.5 g. of $\Delta^6$-dehydroestrone acetate of Example XV in 100 cc. of dry ether. After refluxing for 30 minutes, water and dilute acid were added, the layers were separated and the ethereal solution dried and evaporated. The product obtained from the evaporated ethereal solution was recrystallized from methanol to give 1.1 g. (84%) of $\Delta^6$-dehydroestradiol with a melting point of 225–227° C. $[\alpha]_D^{20}$—179° (dioxane).

Example XVII

A solution of 0.5 g. of $\Delta^6$-dehydroestrone of Example XIV in 80 cc. of ethyl acetate was shaken with 100 mg. of 10% palladium-on-charcoal catalyst in an atmosphere of hydrogen for 25 minutes, i. e. until the theoretical amount of hydrogen was consumed. Filtration, evaporation and recrystallization from methanol yielded .45 g. (90%) of estrone, melting point 256–258° C. $[\alpha]_D^{20}$+162° (dioxane). The ultra-violet absorption spectrum was identical with that of the natural hormone and a mixture of the two specimens showed a melting point of 257–259° C.

Example XVIII

A solution of 9 g. of the $\Delta^{1,4,6}$-androstatrien-17-ol-3-one 17-acetate of Example IX in 900 cc. of mineral oil was aromatized at 600° C. in accordance with the procedure of Example XIV, and after filtration and washing with hexane gave 4.5 g. (52%) of crude phenol with a melting point of 210–230° C. Recrystallization from methanol gave approximately 40% of nearly colorless crystals of $\Delta^6$-dehydroestradiol 17-monoacetate, melting point 245–249° C. Repeated recrystallization and sublimation in vacuo produced an analytical sample having a melting point of 250–252° C. $[\alpha]_D^{20}$—203°, ultra-violet maximum at 222 mu (log E 4.46), 262 mu (log E 3.93) and 302 mu (log E 3.47).

*Analysis.*—Calculated for $C_{20}H_{24}O_3$: C, 76.89; H, 7.74. Found: C, 76.96; H, 7.47.

Acetylation of the foregoing 17-monoacetate in the usual manner with pyridine-acetic anhydride yielded $\Delta^6$-dehydroestradiol-3,17-diacetate as shiny blades upon recrystallization from methanol with a melting point of 153.5–155° C. $[\alpha]_D^{20}$—162° (chloroform), ultra-violet maximum at 264 mu (log E 4.01).

*Analysis.*—Calculated for $C_{22}H_{26}O_4$: C, 74.55; H, 7.39. Found: C, 74.74; H, 7.03.

Saponification with alkali of the 17-monoacetate afforded $\Delta^6$-dehydroestradiol upon recrystallization from dilute methanol. The $\Delta^6$-dehydroestradiol had a melting point of 225–226° C. $[\alpha]_D^{20}$—171°, ultra-violet maximum at 262 mu (log E 4.00) and 302 mu (log E 3.47). No depression of melting point appeared upon admixture with the $\Delta^6$-dehydroestradiol prepared in accordance with Example XVI. The $\Delta^6$-dehydroestradiol exhibited approximately three to five times the biological potency of estrone in rats.

Example XIX

A solution of 1.14 g. of $\Delta^6$-dehydroestradiol 17-monoacetate of Example XVIII in 100 cc. of ethyl acetate was shaken with 50 mg. of 10% palladium-on-charcoal catalyst for one-half hour in an atmosphere of hydrogen. Filtration, evaporation and recrystallization from methanol gave 1 g. (87%) yield of estradiol 17-monoacetate as prisms with a melting point of 217–219° C. $[\alpha]_D^{20}$+47°, ultra-violet maximum at 280 mu (log E 3.42) and minimum at 250 mu (log E 3.03).

*Analysis.*—Calculated for $C_{18}H_{24}O_2$: C, 76.4; H, 8.34. Found: C, 76.76; H, 8.25.

Saponification with alkali produced estradiol with a melting point of 176–177° C. which showed no depression of melting point upon admixture with authentic hormone.

Example XX

A solution of 2.5 g. of $\Delta^6$-dehydroestrone acetate in 70 cc. of glacial acetic acid was refluxed with 0.43 g. of freshly sublimed selenium dioxide for ten to fifteen minutes in a current of nitrogen. After filtration of selenium and pouring into water, there was obtained 2.4 g. of crude equilenin acetate with a reddish color, which was removed on filtration in hexane-benzene (5:1) solution through a short column of alumina. Recrystallization from methanol gave long prisms of equilenin acetate, with a slight pink tinge, melting point 156–157° C. $[\alpha]_D^{20}$+72° (chloroform). No depression was observed on admixture with the acetate (melting point 157–158° C.) prepared from the natural hormone.

*Analysis.*—Calculated for $C_{20}H_{20}O_3$: C, 77.90; H, 6.54. Found: C, 78.16; H, 6.23.

Saponification of the acetate by boiling with 5% methanolic potassium hydroxide solution for twenty-five minutes, followed by sublimation in vacuo and recrystallization from dilute ethanol yielded equilenin, melting point 256–258° C. (red melt), $[\alpha]_D^{20}$+86.4° (dioxane). The melting point was undepressed on mixing with a sample of the natural hormone.

Example XXI

Dehydrogenation of 1 g. of $\Delta^6$-dehydroestradiol-3,17-diacetate with 156 mg. of freshly sublimed selenium dioxide in 15 cc. of boiling acetic acid for eight minutes produced 0.81 g. of 17-dihydroequilenin-17$\beta$-3,17-diacetate with a melting point of 115–118° C. Recrystallization from a mixture of ether-hexane raised the melting point to 125–127° C. $[\alpha]_D^{20}$—15°. No depression of the melting point was observed on mixing the same with a sample prepared by lithium aluminum hydride reduction and subsequent acetylation of natural equilenin acetate. Alkaline saponification of the acetate produced 17-dihydroequilenin-17$\beta$ with a melting point of 246–248° C. in a capillary (241° C. on the Kofler block) $[\alpha]_D^{20}$+64° (dioxane).

We claim:

1. A process for the production of $\Delta^{1,4,6}$-3-ketosteroids, which comprises dibrominating a $\Delta^4$-3-ketosteroid with two equivalents of a brominating agent to form a dibromo Δ⁴-3-ketosteroid capable of forming on dehydrobromination the aforesaid Δ¹,⁴,⁶-3-ketosteroid and thereafter dehydrobrominating said dibromo Δ⁴-3-ketosteroid with a tertiary amine.

2. A process for the production of Δ¹,⁴,⁶-3-ketosteroids, which comprises treating a Δ⁴-3-ketosteroid with two equivalents of bromine at a low temperature in the presence of a lower fatty acid to form a dibromo Δ⁴-3-ketosteroid and thereafter dehydrobrominating said dibromo-Δ⁴-3-ketosteroid with a tertiary amine.

3. A process for the production of Δ¹,⁴,⁶-3-ketosteroids, which comprises treating a Δ⁴-3-ketosteroid with two equivalents of bromine in the presence of acetic acid at a low temperature to form a dibromo Δ⁴-3-ketosteroid and thereafter dehydrobrominating said dibromo Δ⁴-3-ketosteroid with a tertiary amine.

4. A process for the production of Δ¹,⁴,⁶-3-ketosteroids, which comprises treating a Δ⁴-3-ketosteroid at a temperature between approximately 0°–15° C. with two equivalents of bromine in the presence of ether and glacial acetic acid to form a dibromo-Δ⁴-3-ketosteroid and thereafter dehydrobrominating said dibromo-Δ⁴-3-ketosteroid with a tertiary amine.

5. A process for the production of Δ¹,⁴,⁶-3-ketosteroids, which comprises treating a Δ⁴-3-ketosteroid with two equivalents of N-bromosuccinimide in the presence of strong light to form a dibromo-Δ⁴-3-ketosteroid and thereafter dehydrobrominating said dibromo-Δ⁴-3-ketosteroid with a tertiary amine.

6. A process for the production of Δ¹,⁴,⁶-3-ketosteroids, which comprises treating a monobromo-Δ⁴-3-ketosteroid with one equivalent of a brominating agent selected from the group consisting of 2-bromo-Δ⁴-3-ketosteroids and 6-bromo-Δ⁴-3-ketosteroids to form a dibromo-Δ⁴-3-ketosteroid capable of forming on dehydrobromination the aforesaid Δ¹,⁴,⁶-3-ketosteroid and thereafter dehydrobrominating said dibromo-Δ⁴-3-ketosteroid with a tertiary amine.

7. A process for the production of Δ¹,⁴,⁶-3-ketosteroids, which comprises treating a mono bromo-Δ⁴-3-ketosteroid selected from the group consisting of 2-bromo-Δ⁴-3-ketosteroids and 6-bromo-Δ⁴-3-ketosteroids with one equivalent of bromine in the presence of a lower fatty acid at a low temperature to form a dibromo-Δ⁴-3-ketosteroid and thereafter dehydrobrominating said dibromo-Δ⁴-3-ketosteroid with a tertiary amine.

8. A process for the production of Δ¹,⁴,⁶-3-ketosteroids, which comprises treating a mono bromo-Δ⁴-3-ketosteroid selected from the group consisting of 2-bromo-Δ⁴-3-ketosteroids and 6-bromo-Δ⁴-3-ketosteroids with one equivalent of N-bromosuccinimide in the presence of strong light to form a dibromo-Δ⁴-3-ketosteroid and thereafter dehydrobrominating said dibromo-Δ⁴-3-ketosteroid with a tertiary amine.

9. A process for the production of Δ¹,⁴,⁶-3-ketosteroids, which comprises treating a 2-bromo-Δ⁴-3-ketosteroid with one equivalent of bromine in the presence of a lower fatty acid at a low temperature to form a dibromo-Δ⁴-3-ketosteroid and thereafter dehydrobrominating said dibromo-Δ⁴-3-ketosteroid with a tertiary amine.

10. A process for the production of Δ¹,⁴,⁶-3-ketosteroids, which comprises treating a 6-bromo-Δ⁴-3-ketosteroid with one equivalent of bromine in the presence of a lower fatty acid at a low temperature to form a dibromo-Δ⁴-3-ketosteroid and thereafter dehydrobrominating said dibromo-Δ⁴-3-ketosteroid with a tertiary amine.

11. A process for the production of Δ¹,⁴,⁶-3-ketosteroids, which comprises treating a 2-bromo-Δ⁴-3-ketosteroid with one equivalent of N-bromosuccinimide in the presence of strong light to form a dibromo-Δ⁴-3-ketosteroid and thereafter dehydrobrominating said dibromo-Δ⁴-3-ketosteroid with a tertiary amine.

12. A process for the production of Δ¹,⁴,⁶-3-ketosteroids having the following formula:

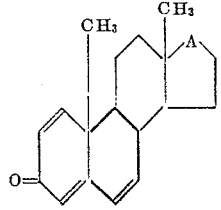

wherein A is selected from the group consisting of C=O and CH—OR and R is selected from the group consisting of hydrogen, a lower alkyl group, a benzyl group, the residue of a lower fatty acid and benzoic acid, which comprises dibrominating a compound of the following formula:

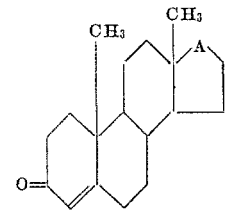

wherein A is selected from the group consisting of C=O and CH—OR and R is selected from the group consisting of hydrogen, a lower alkyl group, a benzyl group, the residue of a lower fatty acid and benzoic acid with two equivalents of a brominating agent to form dibromo derivatives thereof and thereafter dehydrobrominating said dibromo derivatives with a tertiary amine.

13. A method for the production of Δ¹,⁴,⁶-androstatrien-17-ol-3-one, which comprises dibrominating testosterone with two equivalents of a brominating agent to form a dibromo testosterone and thereafter dehydrobrominating said dibromo testosterone with a tertiary amine.

14. A process for the production of esters of Δ¹,⁴,⁶-androstatrien-17-ol-3-one, which comprises dibrominating esters of testosterone with two equivalents of a brominating agent to form a dibromo testosterone ester and thereafter dehydrobrominating said dibromo testosterone ester with a tertiary amine.

15. A process for the production of Δ¹,⁴,⁶-androstatrien-3,17-dione, which comprises dibrominating Δ⁴-androstene-3,17-dione with two equivalents of a brominating agent to form a dibromo-Δ⁴-androstene-3,17-dione and thereafter dehydrobrominating said dibromo-Δ⁴-androstene-3,17-dione with a tertiary amine.

16. A process for the production of Δ¹,⁴,⁶-3-ketosteroids having the following formula:

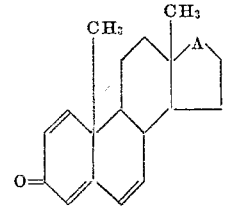

wherein A is selected from the group consisting of C=O and CH=OR and R is selected from the group consisting of hydrogen, a lower alkyl group, a benzyl group, the residue of a lower fatty acid and benzoic acid, which comprises treating a compound of the following formula:

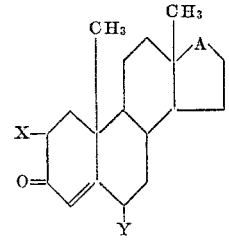

wherein A is selected from the group consisting of C=O and CH=OR; R is selected from the group consisting of hydrogen, a lower alkyl group, a benzyl group, the residue of a lower fatty acid and benzoic acid; and X is bromine when Y is hydrogen and Y is bromine when X is hydrogen, with one equivalent of a brominating agent to form dibromo derivatives thereof and thereafter dehydrobrominating said dibromo derivatives with a tertiary amine.

17. A process for the production of Δ¹,⁴,⁶-androstatrien-17-ol-3-one, comprising treating 2-bromo testosterone with one equivalent of a brominating agent to form dibromo testosterone and thereafter dehydrobrominating said dibromo testosterone with a tertiary amine.

18. A process for the production of esters of Δ¹,⁴,⁶- androstatrien-17-ol-3-one, comprising treating esters of 2-bromo testosterone with one equivalent of a brominating agent to form a dibromo testosterone ester and thereafter dehydrobrominating said dibromo testosterone ester with a tertiary amine.

19. A process for the production of $\Delta^{1,4,6}$-androstatrien-17-ol-3-one, comprising treating 6-bromo testosterone with one equivalent of a brominating agent to form dibromo testosterone and thereafter dehydrobrominating said dibromo testosterone with a tertiary amine.

20. A process for the production of esters of $\Delta^{1,4,6}$-androstatrien-17-ol-3-one, comprising treating esters of 6-bromo testosterone with one equivalent of a brominating agent to form a dibromo testosterone ester and thereafter dehydrobrominating said dibromo testosterone ester with a tertiary amine.

21. A process for the production of $\Delta^{1,4,6}$-androstatrien-3,17-dione, which comprises treating 2-bromo-$\Delta^4$-androstene-3,17-dione with one equivalent of a brominating agent to form dibromo-$\Delta^4$-androstene-3,17-dione and thereafter dehydrobrominating said dibromo-$\Delta^4$-androstene-3,17-dione with a tertiary amine.

22. A process for the production of $\Delta^{1,4,6}$-androstatrien-3,17-dione, which comprises treating 6-bromo-$\Delta^4$-androstene-3,17-dione with one equivalent of a brominating agent to form dibromo-$\Delta^4$-androstene-3,17-dione and thereafter dehydrobrominating said dibromo-$\Delta^4$-androstene-3,17-dione with a tertiary amine.

References Cited in the file of this patent

UNITED STATES PATENTS

| Number | Name | Date |
| --- | --- | --- |
| 2,260,328 | Miescher | Oct. 28, 1941 |
| 2,280,828 | Inhoffen | Apr. 28, 1942 |
| 2,332,815 | Ruzicka | Oct. 26, 1943 |
| 2,340,388 | Inhoffen | Feb. 1, 1944 |
| 2,441,560 | Butenandt | May 18, 1948 |

OTHER REFERENCES

Inhoffen, Annalen 563, 131–134 (1949).